United States Patent [19]

Masclet et al.

[11] 4,071,284
[45] Jan. 31, 1978

[54] METHOD AND APPARATUS FOR EFFECTING DOUBLE-ACTING BRAKING

[75] Inventors: Jean Masclet, Paris; Marcel Schott, Fontenay-le-Fleury, both of France

[73] Assignee: Messier-Hispano, Montrouge, France

[21] Appl. No.: 775,636

[22] Filed: Mar. 8, 1977

Related U.S. Application Data

[63] Continuation-in-part of Ser. No. 602,516, Aug. 6, 1975, abandoned.

[30] Foreign Application Priority Data

Aug. 7, 1974    France ................................. 74 27479

[51] Int. Cl.² ............................................... B60T 7/12
[52] U.S. Cl. ......................................... 303/63; 303/9
[58] Field of Search ....................... 303/2, 3, 9, 13, 15, 303/16, 63, 84 R

[56] References Cited

U.S. PATENT DOCUMENTS

| | | | |
|---|---|---|---|
| 2,876,045 | 3/1959 | Kendig | 303/63 |
| 2,910,326 | 10/1959 | Prather | 303/63 |
| 2,945,727 | 7/1960 | La Dona | 303/63 |

*Primary Examiner*—Duane A. Reger
*Attorney, Agent, or Firm*—Haseltine, Lake & Waters

[57] ABSTRACT

A method and apparatus for effecting double-acting braking for a wheel or a set of wheels permitting compensation of failures of at least one of the braking circuits of a double-acting braking arrangement of the type comprising at least two sets of braking members and two braking circuits for each brake. A single control action achieved by a single actuating member acts simultaneously on the two braking circuits of each of the brakes and in the case of a failure of one of the two braking circuits resulting in a drop in pressure in the failed braking circuit and consequently in a reduction of the braking torque applied by the brake, the remaining circuit has its pressure increased whereby the braking torque is automatically increased by a predetermined value. For this purpose the control action is applied simultaneously to two relays having at least two operating pressure levels, each relay acting on one of the two sets of braking members via the two braking circuits. Detectors are provided in the respective circuits for detecting failures that may occur in the circuits, the detector associated with one of the circuits controlling the power level of the relay connected to the other circuit and vice versa, whereby the pressure level of the relay associated with the braking circuit that remains in operation is increased when a failure is detected in the other circuit.

8 Claims, 6 Drawing Figures

METHOD AND APPARATUS FOR EFFECTING DOUBLE-ACTING BRAKING

CROSS-RELATED APPLICATION

This application is a continuation-in-part of copending application Ser. No. 602,516 filed Aug. 6, 1975 now abandoned.

FIELD OF THE INVENTION

The present invention relates to a method and apparatus for effecting double-acting braking which enable failure of at least one of the braking circuits to be automatically dealt with.

BACKGROUND

Generally, the brakes used for each wheel in double-acting braking systems each comprise two independent sets of braking cylinders, each set however acting simultaneously so that each of the two sets provides approximately 50% of the braking torque.

Then, in the case of failure of one of the braking circuits causing interruption of the action of one of two sets of cylinders, the braking torque is reduced by approximately 50% without its being possible to adjust the remaining torque. It is obvious that this circumstance is very disadvantageous particularly in the case of a braking system for aerodynes.

SUMMARY OF THE INVENTION

An object of the invention is to eliminate this disadvantage. For this purpose, the method of effecting double-acting braking in accordance with the invention consists in using a single control and in acting simultaneously on the two braking circuits of each of the brakes and, in the case of failure of one of the two circuits resulting for example in a drop in hydraulic or pneumatic pressure in the failed braking circuits and consequently in a reduction of the braking torque applied by the brake, in acting on the remaining circuit to increase said braking torque automatically by a predetermined value preferably greater than half the braking torque remaining after failure has occurred.

In accordance with another feature of the invention, the method of the invention consists in applying the control action simultaneously to two relays, for example hydraulic or pneumatic relays, having at least two operating levels which act separately, with the aid of two hydraulic or pneumatic circuits, on two series of brake members, to detect failures which may occur in said circuits, in raising the operating level of the relay associated with the circuit that remains in operation when a failure is detected in the other circuit, and finally and if necessary disconnecting the failed circuit.

The circuits and the technique used for operating the method and system according to the invention may of course be mechanical and/or hydraulic and/or pneumatic and/or electromechanical, etc.

Furthermore, the method and system of the invention may be used in cooperation with other means for braking the vehicle. In the case of an aerodyne for example, they may cooperate with the aero-brakes, the system for reversing the flow in the jets, and with a system for regulating braking in dependence upon adherence to the ground, such as an anti-skid arrangement.

BRIEF DESCRIPTION OF THE DRAWINGS

Some embodiments of the invention will now be described by way of non-limiting examples and by reference to the annexed drawings in which.

DETAILED DESCRIPTION

Figure 1:
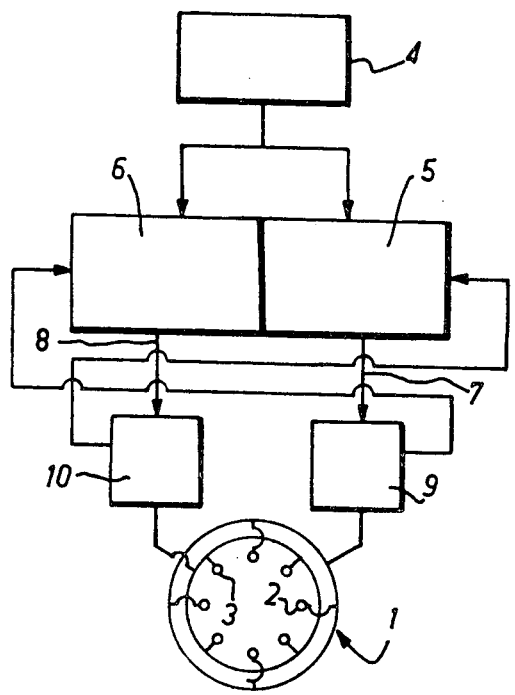
FIG. 1 is a block diagram of double-acting braking system used on one brake.

Referring to FIG. 1 which illustrates the method of the invention, the double-acting brake system is used on one brake 1 of a wheel or a set of associated wheels, for example those of bogies, comprising two independent sets 2 and 3 of driven braking cylinders. This system comprises firstly an operating member 4, for example a brake-pedal associated in the conventional manner with a master cylinder. This master cylinder acts simultaneously on two reducing relays 5 and 6 having at least two control levels and connected respectively to the two sets 2 and 3 of driven cylinders of the brake 1 by way of two independent power circuits 7 and 8, each comprising a detector 9 and 10 respectively. The detector 9 enables failures to be detected in the circuit 7 with which it is associated, and it ensures operation at the power level of the relay 6. Similarly the detector 10, associated with the circuit 8, ensures operation at the power level of the relay 5.

In a normal braking arrangement, the reducing relays 5 and 6, acted upon simultaneously by the driver's operating means, separately provide the two sets of driven cylinders 2 and 3 of the brake 1 with the pressure necessary for a nominal given braking torque.

In the case of the occurrence of a failure affecting, for example, the circuit 7 and resulting in a drop of pressure in the set of driven cylinders 2 (and consequently in a reduction of the braking torque which may be as much as 50% of the nominal torque), the corresponding detector 9 actuates the relay 6 which moves to a higher power level. Thereafter, the set of driven cylinders 3 is subjected to a greater pressure, and the braking torque is increased by a predetermined value.

A similar series of actions takes place in the event of a failure affecting the circuit 8.

Figure 2:
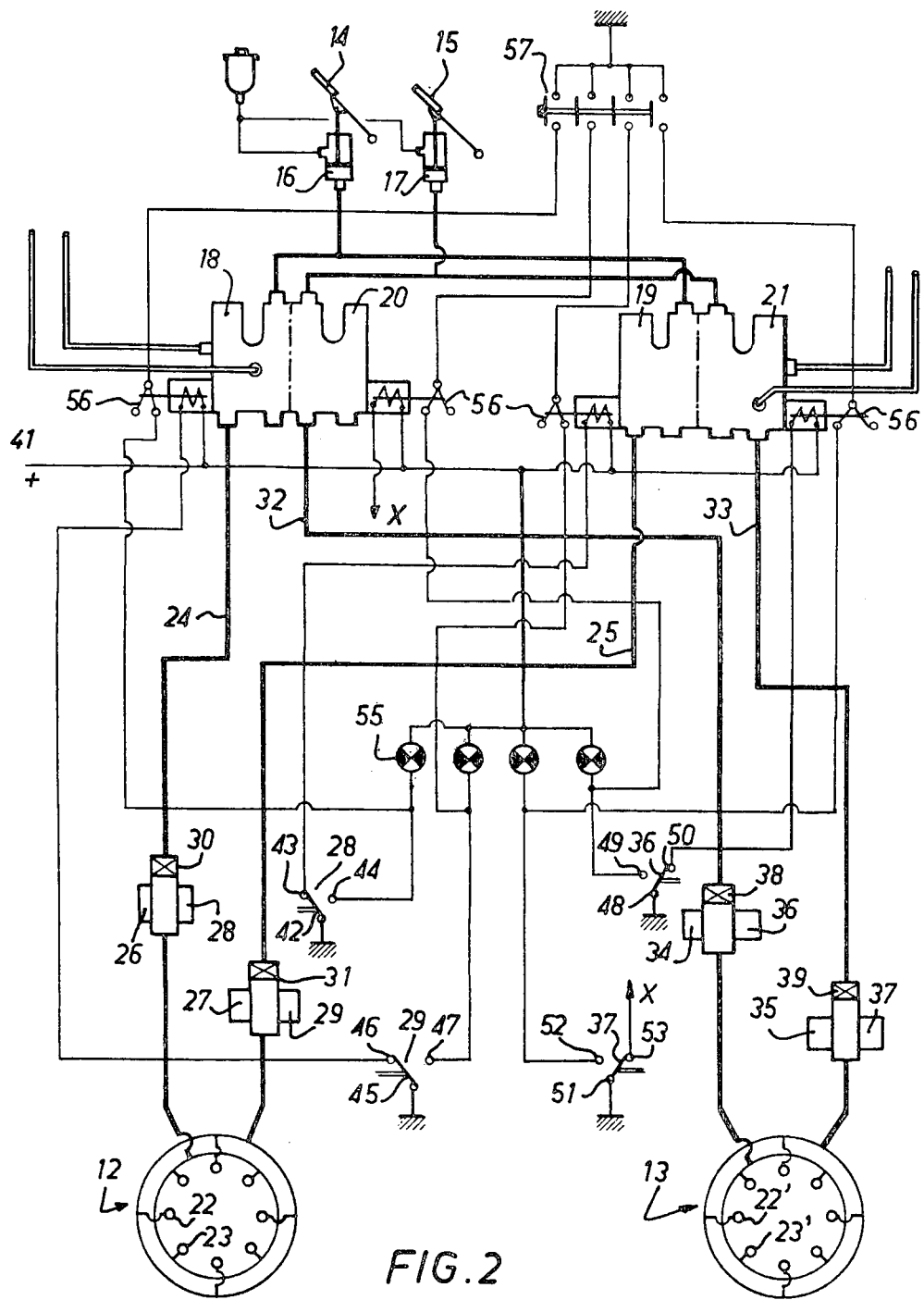
FIG. 2 shows a layout of a double-acting braking system which is mainly mechanico-hydraulic and used on the brakes, and which comprises a control arrangement enabling operating faults to be detected.

Referring to FIG. 2 which relates to double braking systems used on two brakes 12 and 13 respectively, control is carried out in the conventional manner by each of the brake 12 and 13 through pedals 14 and 15 associated with master cylinders 16 and 17 respectively. Each of the master cylinders 16 and 17 actuates two hydraulic relays separately but simultaneously, namely, hydraulic reducing relays 18 and 19 in the case of the master cylinder 16 and hydraulic reducing relays 20 and 21 in the case of the master cylinder 17.

Figure 6:
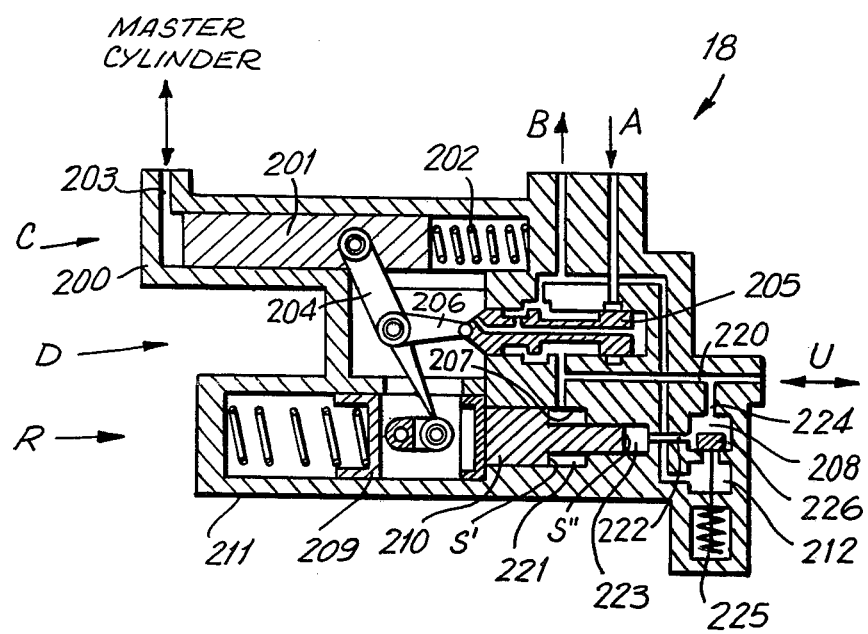
FIG. 6 illustrates in section a known reducing relay for use in the system of the invention.

The hydraulic reducing relays 18, 19, 20 and 21, which are of identical design, are entirely conventional and may be constructed as shown in FIG. 6.

Therein is seen a reducing relay 18 consituted by a control system C a distribution system D and a counter-acting system R. The system C comprises a cylinder 200 slidably supporting a control piston 201 pivotally connected to the extremity of a lever 204. The piston 201 is displaced against the opposition of a return spring 202 by hydraulic fluid coming from the master cylinder and introduced into the cylinder 200 through the feed orifice 203.

The distribution system D comprises a slide valve 205 pivotably connected to the central portion of the lever 204 by means of a connecting rod 206 and capable of providing communication between a feed orifice A and a utilization orifice U connected to the brakes when the brake pedal is depressed. Upon depression of the brake pedal, hydraulic fluid coming from the master cylinder displaces the piston 201 against the spring 202 which produces a displacement of the lever 204 and thereby the slide valve 205. The slide valve is also capable of placing the utilization orifice U into communication with a discharge orifice B to the low pressure reservoir when the brake pedal is released at which time the piston 201 is returned by the spring 202 (as shown in FIG. 6) which produces a reverse displacement of the lever 204 and the slide 205.

The counter-acting system R essentially comprises a step cylinder 207 in which is slidably mounted a piston 210 having two surfaces S' and S" respectively defining, with the step cylinder, chambers 221 and 223 which are connected to the utilization orifice U by the conduit 220 for the chamber 221 and by the conduits 222 and 224 and the chamber 208 for the chamber 223.

The piston 210 of the counter-acting system acts against the action of a progressively acting spring 211 on a slide 209 to which the lower extremity of the lever 204 is pivotably connected.

Also provided in the hydraulic reducing relay is an apparatus acting on the counter-acting system comprising a valve 226 when its stem traversing chamber 212 connected to the discharge orifice B is displaced by a control means comprising, for example, an electromagnet 225.

The hydraulic reducing relay 18 thus described operates as follows.

When the control piston 201 is subjected to the braking control pressure coming from the master cylinder, the slide valve 205 is displaced so that the feed A will be placed into communication with the utilization orifice U. The liquid then passes rapidly into the cylinders of the brakes and the approach travel of the brake pistons is effected. Then the liquid filling the chambers 221 and 223 begins to act on the counter-acting piston 210 which is displaced against the progressively acting spring 211 by driving the lever 204 and, therefore, also the slide valve 205. This movement is halted when the utilization orifice U is cut-off along with the feed orifice A and the discharge orifice B. The feed pressure acting on the brake is then isolated and holds the brake applied up to the time of brake release.

When the double systems of braking according to the invention are in operating state, the valve 226 is maintained in open position. If one of the braking systems is put out of service, which can be detected by a pressure contacter as will be explained hereafter, the electromagnet 225 causes the closure of the conduit 224 by the valve 226. The chamber 223 is then placed into communication with the discharge orifice B through the intermediary of chambers 208 and 212 and the counter-acting piston 210 produces an increase in pressure in the chamber 221 and, therefore, in the utilization circuit by a value determined by the area of surfaces S' and S".

Therefore, the reducing relay can produce two pressure levels in utilization circuit U depending on the state in the braking circuits.

For brake release, the pressure drops in the master cylinder when the brake pedal is released and the control piston 201 is returned to its initial position by the spring 202 which drives the lever 204 and the slide 205 which provides communication between the utilization circuit U and the discharge circuit B. Since the pressure no longer acts on the counter-acting piston 210, the latter is returned to initial position by the spring 211.

The hydraulic reducing relays 18 and 19 are connected respectively at the utilization orifices U to two sets of driven cylinders 22 and 23 of the brake 12 by means of two separate hydraulic circuits 24 and 25 each comprising a servo-valve 26 and 27 respectively actuated for example by an anti-skid system, a pressure contactor 28 and 29 respectively and a hydraulic cut-out 30 and 31 respectively. The pressure contactor 28, associated with the operating circuit 24 of the hydraulic reducing relay 18 operates the counter-acting system R of the hydraulic relay 19, whereas, conversely, the pressure contactor 29 of the operating circuit 25 of the hydraulic relay 19 serves to operate the counter-acting system R of the hydraulic reducing relay 18.

The hydraulic cut-out 30 and 31 block the corresponding hydraulic circuits 24 and 25 respectively in the event of failure in that portion of the circuits extending between the servo-valve and the brake cylinders, or hydraulic elements associated therewith.

Similarly, the hydraulic circuits 32 and 33 of the relays 20 and 21, terminating at the two sets of driven cylinders 22' and 23' of the brake 13, each comprise a servo-valve 34 and 35 respectively, a pressure contactor 36 and 37 respectively and a hydraulic cut-out 38 and 39 respectively. In the same way the pressure contactors 36 and 37 are reciprocally connected to the counter-acting system/R of the hydraulic reducing relays 20 and 21.

In the example illustrated, the counter-acting system/R of the hydraulic reducing relays 18, 19, 20 and 21 is operated electrically by means of electrically operated valve/208 provided in each of the relays.

The control winding/225 of each of these electrically operated valves is connected, on the one hand, to the positive pole 41 of a source of electric energy and, on the other, and in the manner previously described, to the corresponding pressure contactors 28, 29, 36, 37. Each of the pressure contactors 28, 29, 36 and 37 comprises a moving contact connected to ground and two contact studs, one connected to the winding of the corresponding electrically operated valve, and the other connected to a control and signalling circuit which will be described hereinafter.

In this connection it will be noted that the contact stud connected to the control and signalling circuit corresponds to the rest position of the counter-acting system of the hydraulic relay to which it is connected.

Thus, the pressure contactor 28 comprises a moving contact 42 and contact studs 43 and 44, the pressure contactor 29 comprises a moving contact 45 and contact studs 46 and 47, the pressure contactor 36 comprises a moving contact 48 and contact studs 49 and 50, and finally the pressure contactor 37 comprises a moving contact 51 and contact studs 52 and 53.

Consequently, when the hydraulic pressure in one of the circuits 24, 25, 32, or 33 drops below a predetermined pressure, the pressure contactor associated therewith closes the circuit of the coil/225 of the electrically operated valve/208 to which it is connected and keeps the control and signalling circuit open. Conversely, when the pressure in this circuit rises above the predetermined pressure, the pressure contactor opens the circuit of the winding of the corresponding electrically operated valve and closes the control and signalling circuit.

Consequently, in the case where, during braking, a drop in pressure occurs for example in the operating circuit 25 of the hydraulic reducing relay 19 and, as a result, the braking torque of the brake 12 is reduced, this defect is detected by the pressure contactor 29 which closes the control citcuit of the counter-acting system of the hydraulic reducing relay 19. The hydraulic reducing relay 18 then increases, in a predetermined manner, the pressure applied to the set of drive cylinders 22 associated therewith so as to establish a braking torque greater than that produced by a single circuit 24 or 25 and, if required, similar to that which the two sets of driven cylinders 22 and 23 would produce during normal simultaneous operation. A similar function would occur in the case of failure of the operating circuit of the relay 18 as regards the brake 12. The same would apply in the case of the braking circuit associated with the brake 13 which are identical to those of brake 12 and the mode of operation of which will not again be described.

It may be mentioned, by way of example, that particularly for an aerodyne and in the case where, for one and the same brake, each of the two operating circuits of a hydraulic relay delivers 50% of the nominal pressure necessary for obtaining the nominal braking torque, then for a deceleration of 0.4 g and when one of these two circuits fails, the change in the degree of counter-action of the hydraulic reducing relay corresponding to the circuit that remains effective may be calculated to enable a deceleration of 0.3 g (instead of 0.2 g) to be obtained.

In the case where a loss of pressure occurs in one of the operating circuits during the braking operation, the response time of the pressure contactor is of course a function of the rate of drop of pressure in this circuit. Where the pressure drop is slow, the safety action will take place only after expiration of a certain period, whereas when loss of pressure is instantaneous, the safety action will take place immediately.

Also, the pressure contactors generally operate on the basis of a predetermined pressure, for example, of the order of 20 bars. Consequently, during normal operation without loss of pressure, during the first braking phase (the approach phase), the control circuits of the counter-acting systems of the two hydraulic reducing relays associated with one and the same brake are energized. Consequently, filling of the brake is accelerated, and a much greater pressure is obtained than ordinarily at the inlet to each of the operating circuits (for example 30 bars). However, when the pressure at the pressure contactors reaches a predetermined pressure (of 20 bars), the control circuits of the counter-acting systems are no longer acted upon, and the pressure applied to the two sets of driven cylinders becomes normal and the distance-pressure law results in 50-50% conditions for each of the two sets of driven cylinders.

Conversely, when the driver takes his foot from the pedals, this causes the driven cylinders of the brakes to be connected to the tank, and when the pressure in the circuits becomes lower than or equal to the predetermined pressure (13 bars), the pressure contactors energize the control member of the counter-reacting system (windings of the electrically operated valves) of the hydraulic reducing relays.

The arrangement for controlling and monitoring the double-acting braking system illustrated in FIG. 2 comprises, for each of the control circuits of each of the brakes 12 and 13, an indicating light 52 connected directly to the positive pole of the source of electric current 41. This indicating light is controlled by two return circuits, arranged in parallel, namely a circuit connected as previously mentioned to the second contact stud 44, 47, 49 and 52 respectively of the corresponding pressure contactor, and a circuit comprising in series, a contactor 56 controlled by the winding of the electrically operated valvc of the hydraulic reducing relay in the circuit of the brake in question, and a manual control switch 57 connected to ground. The contactor 56 closes when the winding of the electrically operated valve of the relay is acted upon by the pressure contactor that is associated with it.

Thus, the indicating light associated with a brake-control circuit lights up when the pressure detected by the corresponding pressure contactor is equal to or greater than a predetermined pressure P1, whereas this light is extinguished when the pressure drops below another predetermined pressure P2 (P2<P1), and in the case where the corresponding circuit, comprising the contactor 56 and the switch 57, is open.

Similarly the indicating light lights up when the manual control switch 57 is closed and when the contactor 56, acted upon by the winding of the corresponding electrically operated valve, is likewise closed.

This system thus permits, in particular, the detection of pressure failures in the operating circuits of the hydraulic reducing relays or in the driven cylinders of the brakes, as well as failures due to blockage of one or more of the electrically operated valves or even when the pressure contactors break down. It also enables breakages in its own indicating lights to be detected as well as general failures in the supply of current.

Figure 3:
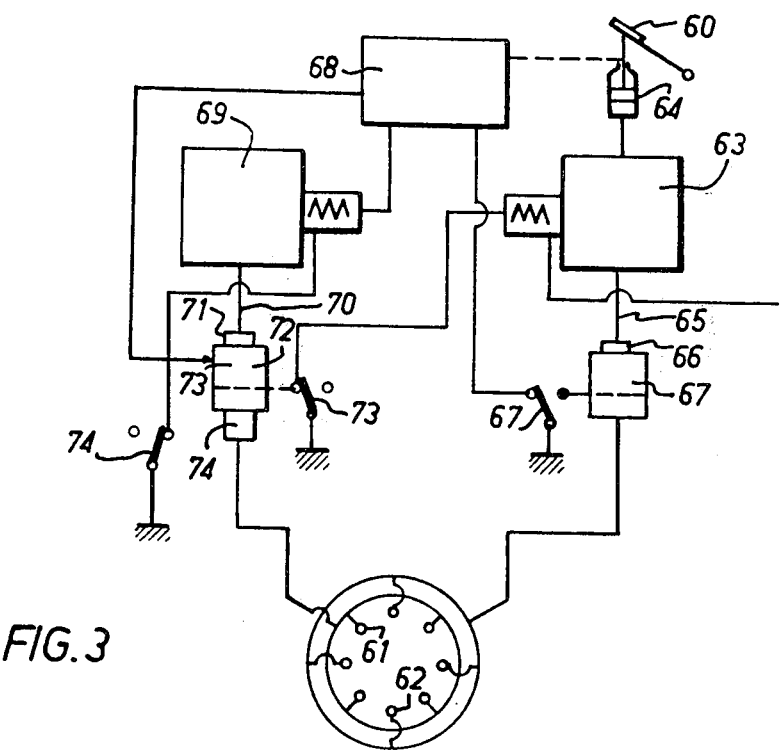
FIG. 3 is a block diagram of a double-acting braking system used on one brake and employing a combined electro-hydraulic and mechanico-hydraulic technique.

Referring to FIG. 3, the system for the double-acting braking of a wheel or a number of associated wheels, (for example a bogie) comprises two braking circuits controlled by one and the same brake-pedal 60, namely a basically hydraulic circuit similar to those previously described in relation to FIG. 2, and an electrohydraulic circuit, these two circuits separately supplying two sets 61 and 62 of driven brake cylinders.

The hydraulic circuit comprises a hydraulic reducing relay 63 controlled by a master cylinder 64 associated with the brake-pedal 60. This hydraulic reducing relay 63 feeds an operating circuit 65 terminating at the set of driven cylinders 62. The operating circuit 65 comprises in succession a hydraulic cut-out 66 and a pressure contactor 67 for detecting braking pressure.

The electro-hydraulic circuit comprises an electronic control system 68 comprising electronic elements receiving signals relating to the position of the brake-pedal. This electronic system 68 controls an electrically operated valve 69 connected to the second set 61 of the driven brake cylinders by means of an operating circuit 70 comprising, in succession, a hydraulic cut-out 71, a servo-valve 72, a pressure contactor 73 for detecting the residual braking pressure, and a pressure contactor 74 for detecting breakdowns in the servo-valve 72. The servo-valve 72 receives, from the electronic control system 68, a signal which is a function of the position of the brake-pedal 60, and delivers a braking pressure which is a function of this signal.

Consequently, the electronic system 68 must of necessity comprise, on the one hand, means for sending a signal which opens the electrically-operated valve 69 when the brake-pedal is actuated, and, on the other hand, means for sending a signal for effecting opening or closing of the servo-valve 72 as a function of the position of the brake-pedal 60 so as to establish hydraulic pressure in the set 61 of brake cylinders that is compatible with the hydraulic pressure provided in the set 62 of brake cylinders by the hydraulic reducing relay 63.

This electronic system 68 also receives signals from the pressure contactor 67 provided in the hydraulic circuit 65, and finally comprises means permitting an increase in the level of pressure delivered by the servo-valve when the pressure contactor 67 detects a pressure lower than a predetermined pressure in the hydraulic circuit 65.

It will be appreciated that the electronic system 68 can be formed with the aid of various electronic means which will not be described herein since they do not form any part of the present invention. However, it should be stated by way of example and for the purpose of explaining this system, that the electrically operated valve 69 can be actuated by a cut-out switch operated by the brake-pedal, and by a two-level output amplifying selector actuated by the pressure contactor 67. The servo-valve 72 may be actuated by way of a rheostat or any other suitable device linked with the brake-pedal 60 and able to provide a current or voltage, the magnitude of which is dependent upon the position of the pedal.

Conversely, the pressure contactor 73 controls the counter-acting system of the hydraulic reducing relay 63 in the manner previously described with reference to FIG. 2.

The control winding of the electrically operated valve 69 which receives a signal from the electronic control system 63 is arranged in series with the pressure contactor 74 used for detecting breakdowns of the servo-valve 72.

Thus, in the event of breakdown of the servo-valve 72, the electrically operated valve 69 necessarily remains closed, and no hydraulic pressure is transmitted to the circuit 70 terminating at the set 61 of driven cylinders.

Figure 4:
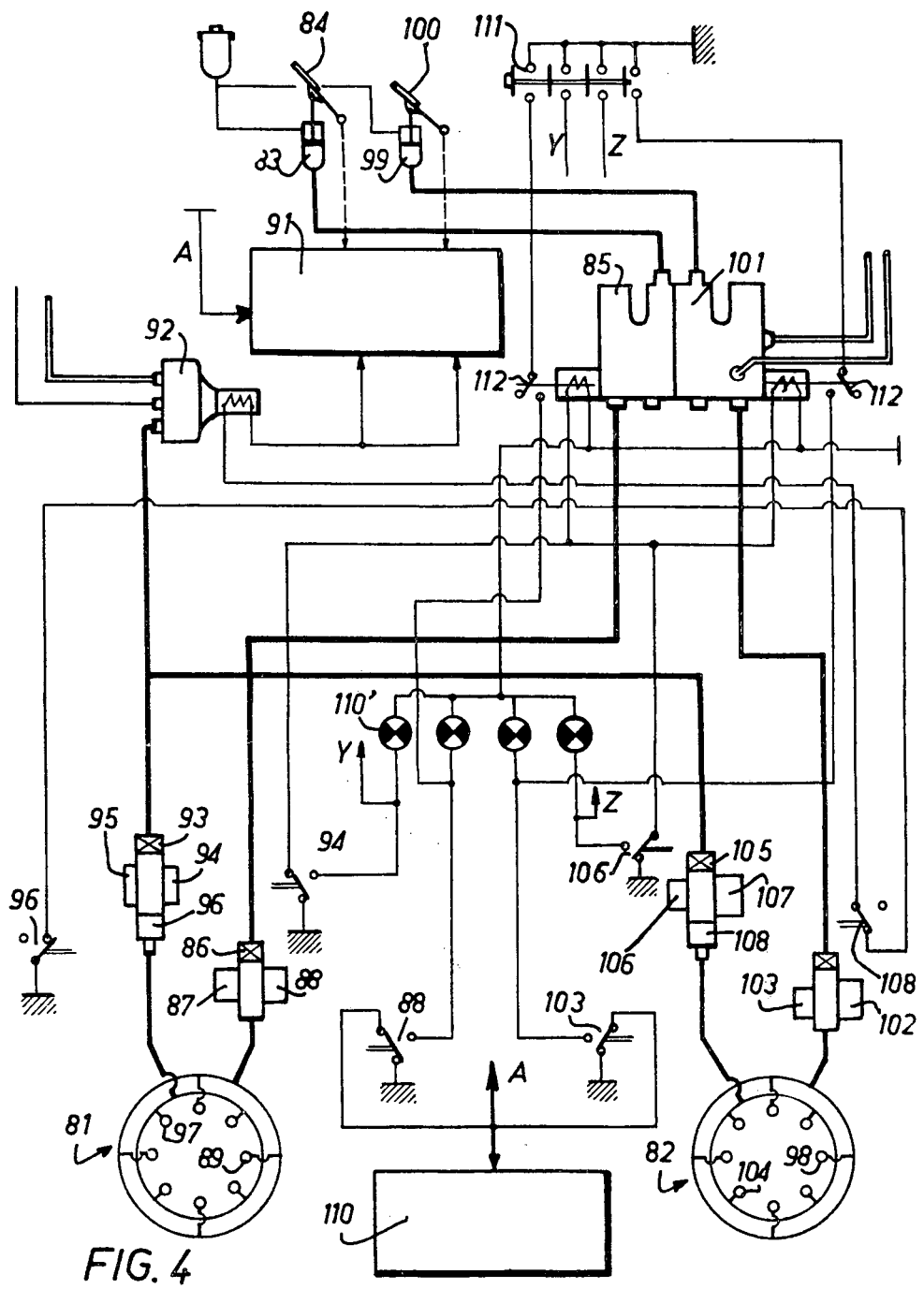
FIG. 4 shows a layout of a double-acting control system of the kind illustrated in FIG. 3 but used on two brakes.

Referring to FIG. 4, the double-acting braking system comprises, for each of the brakes 81 and 82, a system of the type illustrated in FIG. 3, namely:

for the brake 81: a hydraulic system comprising a master cylinder 83 associated with the pedal 84, a hydraulic reducing relay 85, a hydraulic cut-out 86, a servo-valve 87 and a pressure contactor 88, all of which terminate at the set of cylinders 89; and an electrohydraulic system comprising an electronic control system 91 associated with the pedal 84, and an electrically operated valve 92, a hydraulic cut-out 93, a pressure contactor 94 for detecting residual braking pressure, a servo-valve 95 and a pressure contactor 96 for detecting breakdowns in the servo-valve 95, all of which terminate at the set of driven cylinders 97;

and, in a similar manner, for the brake 82: a hydraulic system terminating at the set of driven cylinders 98, and comprising a master cylinder 99 associated with the pedal 100, a hydraulic reducing relay 101, a servo-valve 102 and a pressure contactor 103; and an electrohydraulic system terminating at the set of driven cylinders 104 and comprising the electronic control system 91 which is also associated with the pedal 100, the electrically operated valve 92, a hydraulic cut-out 105, a pressure contactor 106 for detecting residual pressure, a servo-valve 107 and a pressure contactor 108 for detecting breakdowns in the servo-valve 107.

The electrically operated valve 92 is common to the two circuits terminating at the driven cylinders 97 and 104 of the brakes 81 and 82. Similarly, the electronic control system 91 is double-acting and it is connected to the electrically operated valve 92 by a single circuit.

This feature does not, however, alter the operating principle of the system illustrated in FIG. 3.

The pressure contactors 103 and 86, which control the level of the pressure delivered by the servo-valves 95 and 107, are likewise connected to a system 110 for automatically regulating the braking action. Furthermore, the electrically operated valve 92 can only be opened if it receives a control signal from the electronic system 91 and if the pressure contactors 96 and 108 are closed.

The double-acting braking system illustrated in FIG. 4 also comprises a control and monitoring system of the type described in connection with FIG. 2. This system comprises indicating lights 110' associated with each of the circuits terminating at each of the sets of driven brake cylinders 89, 97, 98 and 104. These indicating lights 110' are controlled respectively, on the one hand, by the pressure contactors 94 and 96 and, on the other hand, by the switches 111 arranged in series with the contactors 112 associated with the electrically operated valves of the hydraulic reducing relays 85 and 101, in the case of indicating lights contained in a basically hydraulic circuit.

As with the system described in connection with FIG. 2, this control and safety system not only permits the detection of breakdowns that may occur in the hydraulic brake circuits, but also breakdowns that may take place in its own circuit.

Figure 5:
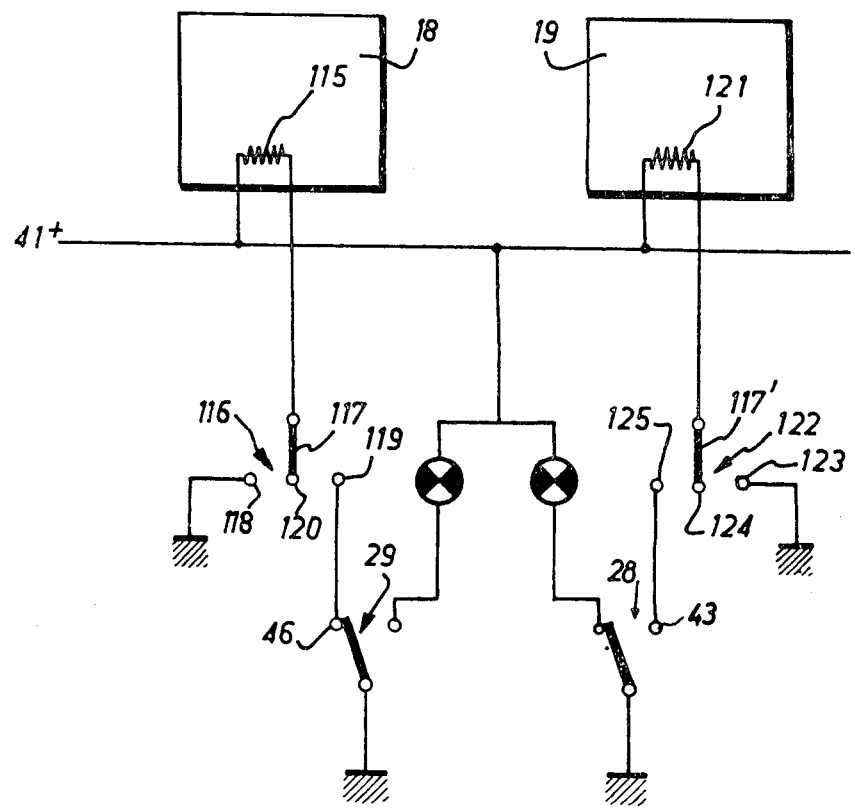
FIG. 5 illustrates a switching arrangement whereby control can be carried out manually or automatically in the double-acting braking systems illustrated in FIGS. 2 and 4.

Referring to FIG. 5, which illustrates a switching scheme for the manual or automatic operation of a double-acting braking system such as that illustrated for example in FIG. 2, the winding 115 of the electrically operated valve of the control means 18 which, in this case is a hydraulic reducing relay, is on the other hand connected, in the manner previously described, to the positive pole 41 of a source of electric energy and, on the other hand, to the contact stud 46 of the pressure contactor 29 contained in the circuit 25 of the control means 19 which in this case is a reducing relay, the connection being by way of a switch 116.

This switch 116 comprises a moving contact 117, connected to the winding 115, and three contact studs, i.e., a stud 118 connected to ground, a stud 119 connected to the stud 46 of the pressure contactor 29, and an intermediate non-operating stud 120.

Thus, to achieve automatic actuation of the counter-acting system of the reducing relay 18, all that is required is to connect the moving contact 117 to the contact stud 119. The circuit of the winding 115 is then connected to the pressure contactor 29.

On the other hand, manual control is carried out by connecting the moving contact to the actuating contact stud 118 or to the non-operative stud 120. It is obvious that connection of the moving contact 117 with the stud 120 keeps the circuit of the winding 115 open; consequently, the counter-acting system is not acted upon, and the reducing relay functions in the normal manner. On the other hand, when the moving contact 117 is connected to the contact stud 118, the winding 115 is energized, and the degree of counter-action is consequently varied.

Similarly, the control circuit of the winding 121 of the electrically operated valve of the reducing relay 19 comprises a switch 122 having three contact studs, i.e., a stud 123 connected to ground, a moving contact 117' and a contact stud 125 connected to the stud 43 of the pressure contactor 28. This circuit operates in a similar manner to the previous one and will not therefore be described again.

The switches 116 and 122 can be operated manually or by way of electronic, electro-mechanical or other means. It may also be connected to means for adjusting or correcting the braking action. Similarly, the elements for actuating the moving contacts 117, 117'..., may comprise means whereby they can be coupled or uncoupled.

The previously described switching arrangement can of course be used with the system illustrated in FIG. 4.

What is claimed is:

1. A method for effecting double-acting braking for a wheel permitting compensation of failures of at least one of the braking circuits of a double-acting braking arrangement of the type comprising at least two sets of braking members and two braking circuits for each brake, the method comprising using a single control action and acting simultaneously on the two braking circuits of each of the brakes and, in the case of a failure of one of the two braking circuits resulting in a drop in pressure in the failed braking circuit and consequently in a reduction of the braking torque applied by the brake, acting on the remaining circuit to increase the pressure in the remaining circuit and the braking torque automatically by a predetermined value, by applying the control action simultaneously to two relays having at least two operating pressure levels, each acting on one of the two sets of braking members by the two braking circuits, detecting failures that may occur in said braking circuit, increasing the pressure level of the relay associated with the braking circuit that remains in operation when a failure is detected in the other circuit, and disconnecting the failed circuit.

2. A double-acting braking system for a wheel comprising at least two sets of braking members and two braking circuits for each brake permitting compensation of failures in at least one of the braking circuits, a single actuating member acting simultaneously on the two braking circuits of each of the brakes and means which in the event of failure of one of the two circuits enables the remaining circuit to be acted upon for increasing the braking torque by a predetermined value, said means comprising a power relay having at least two control levels and each connected to a respective one of the sets of braking members by one of the braking circuits, each braking circuit being an independent power circuit and comprising a detector, the detectors of the two circuits being so arranged that the detector associated with one of the circuits controls the power level of the relay connected to the other circuit, and vice versa.

3. A system according to claim 2, wherein said actuating member comprises a pedal associated with a master cylinder, said power relays being hydraulic relays each comprising a control system receiving pressure from the master cylinder associated therewith, a distributing system including means which, depending upon the control pressure, is able to connect a feed circuit to an operating circuit connected to the corresponding set of braking members or to a discharge circuit, a counter-acting system enabling, when braking takes place, the operating circuit to be isolated from the feed circuit and from the braking circuit, and means enabling the degree of counter-action to be varied so that the pressure of the hydraulic fluid in the operating circuit can be increased by a predetermined value, said detectors being pressure switches.

4. A system according to claim 3, comprising for each of the hydraulic circuits terminating at the two sets of braking members, an indicating light actuated by two circuits arranged in parallel including a first circuit connected to the pressure switch associated with said hydraulic circuit, and a second circuit comprising, in series, a switch associated with the means for modifying the degree of counter-action of the hydraulic relay of said hydraulic circuit and a manual control switch.

5. A system according to claim 3, wherein for one and the same brake of a wheel two braking circuits are provided controlled by one and the same brake pedal and separately feeding two sets of braking means including a substantially hydraulic circuit and an electro-hydraulic circuit, said hydraulic circuit comprising a hydraulic relay connected to an operating circuit comprising a hydraulic cut-out and a pressure switch, said operating circuit terminating at one of the sets of braking members, the electro-hydraulic circuit comprising an electronic control system receiving signals relating to the position of the brake-pedal and controlling an electrically operated valve connected to the second set of braking members by means of another operating circuit comprising, in succession a hydraulic cut-out, a servo-valve and a pressure switch for detecting the residual braking pressure of the pressure contactor.

6. A system according to claim 5, wherein said electronic control system comprises means for sending a signal for opening said electrically operated valve when the brake-pedal is actuated, means for sending a signal for opening or closing said servo-valve as a function of the position of the brake pedal, and means for permitting an increase in the level of pressure delivered by the servo-valves when the pressure switch associated with the substantially hydraulic circuit detects a pressure lower than a predetermined pressure.

7. A system according to claim 2, wherein said actuating member comprises a brake pedal operating several wheels independently of each other.

8. A system according to claim 2, in which the relays are electrically operated and the control of said relays comprises a switching system for operating between manual and automatic control in which switching system, for one and the same brake, the winding of the electrically operated valve of one of the relays is connected, on the one hand, to the positive pole of a source of electric energy, and, on the other hand to the pressure switch of the hydraulic circuit of the other relay by a switch comprising three contact studs, including a stud connected to ground, an intermediate free stud, and a stud connected to said pressure switch, the moving contact of said switch being connected to said winding.

* * * * *